United States Patent
Young

Patent Number: 5,988,667
Date of Patent: Nov. 23, 1999

[54] ANTI-RATTLE DEVICE FOR A TRAILER HITCH

[75] Inventor: David A. Young, Plymouth, Mich.

[73] Assignee: Draw-Tite, Inc., Canton, Mich.

[21] Appl. No.: 08/817,477

[22] PCT Filed: Aug. 22, 1996

[86] PCT No.: PCT/US96/13971

§ 371 Date: Apr. 18, 1997

§ 102(e) Date: Apr. 18, 1997

[87] PCT Pub. No.: WO97/07998

PCT Pub. Date: Mar. 6, 1997

Related U.S. Application Data

[60] Provisional application No. 60/002,695, Aug. 23, 1995.

[51] Int. Cl.⁶ .................................................. G60D 1/00
[52] U.S. Cl. ............................................................. 280/506
[58] Field of Search ................................. 280/506, 504, 280/491.5, 495

[56] References Cited

U.S. PATENT DOCUMENTS

| | | |
|---|---|---|
| 2,189,170 | 2/1940 | Gaussoin . |
| 2,665,902 | 1/1954 | Allen . |
| 2,685,468 | 8/1954 | Blocker et al. . |
| 3,630,321 | 12/1971 | Hollnagel . |
| 3,990,722 | 11/1976 | Casad et al. . |
| 4,050,714 | 9/1977 | Epp ........................................ 280/495 |
| 4,072,257 | 2/1978 | Hall ...................................... 224/29 R |
| 4,746,138 | 5/1988 | James . |
| 4,978,133 | 12/1990 | Thorne et al. . |
| 5,333,888 | 8/1994 | Ball . |
| 5,344,175 | 9/1994 | Speer . |
| 5,449,100 | 9/1995 | Eckhart . |
| 5,593,172 | 1/1997 | Breslin ................................... 280/506 |

*Primary Examiner*—Lanna Mai
*Assistant Examiner*—Avraham H. Lerner
*Attorney, Agent, or Firm*—Leon E. Redman; Lloyd D. Doigan

[57] ABSTRACT

An anti-rattle device (10) for a receiver trailer hitch (30) for reducing undesirable movement, nose, vibration and shock between the shank (40) of a hitch mount (34) and the tubular receiver (32) in which the mount (34) is removably secured by a cross pin (36) includes an elastomeric deformable member (14) deformed into frictional engagement with the shank (40) and the receiver (32) by a slidable plate (12) tensioned against the deformable member (14) by threaded eyebolts (16, 18) anchored to the cross pin (36).

18 Claims, 3 Drawing Sheets

ANTI-RATTLE DEVICE FOR A TRAILER HITCH

This application claims the benefit of U.S. Provisional Application No. 60/002,695 filed Aug. 23, 1995.

FIELD OF THE INVENTION

The present invention relates to receiver trailer hitches and in particular to an anti-rattle device to eliminate undesirable noise, movement and vibration sometimes associated with removable mounts.

BACKGROUND OF THE INVENTION

Receiver-type trailer hitches employ a removable ball mount which is slidably received into a hitch receiver with a somewhat loose fit therebetween necessary to facilitate insertion and removal of the ball mount. The ball mount is secured in the hitch receiver by a cross pin and clip. The most common form of a receiver trailer hitch employs a ball mount with a square shank formed from tubing or solid bar stock which is sized and configured to be inserted into a complementary receiver tube. The ball mount may be removed when it is not going to be used. Various ball mount configurations may be used with a given receiver to accommodate trailers of various heights or various ball mount lengths.

Receiver-type hitches are also used with bicycle carriers, ski carriers and other devices having a mounting member adapted for insertion into a receiver-type hitch.

In receiver-type hitches it is necessary to provide clearance between the outer surface of the shank of the ball mount and the complementary inner surface of the receiver to facilitate easy insertion and removal of the shank. Also clearance must be provided between the cross pin and corresponding holes in the receiver and shank to facilitate insertion and removal of the crosspin. The clearance between the shank and the receiver permit relative movement vertically, laterally and rotationally. The clearances between the crosspin and the holes in the receiver and shank permit relative fore and aft movement. While the clearances are necessary, such erratic movements are undesirable in that they may result in unwelcome rattle noise, vibration and shock.

It would be very advantageous if a means could be provided that eliminates the free play movement between a mount shank, hitch receiver and crosspin in all directions. The instant invention provides such a device.

SUMMARY OF THE INVENTION

It is therefore a primary object of the invention to eliminate undesirable relative movement between the shank of a removable mount and the receiver of a receiver-type trailer hitch to eliminate noise, vibration and shock.

It is a further object to eliminate such undesirable relative movement in all directions.

It is yet another object to provide a device which can achieve the foregoing but cannot be inadvertently mistaken by the user as being the sole means to secure the mount shank in the receiver tube.

It is yet another object to accomplish the foregoing with a device that can be used on existing receiver hitches without requiring modification of either the mount or receiver.

It is yet a still further object to achieve all of the foregoing by providing a device that is inexpensive and easy to install.

These and other objects and advantages are achieved by the invention as will be apparent from the following description, drawing and claims.

DESCRIPTION OF THE PREFERRED EMBODIMENT

Figure 1:
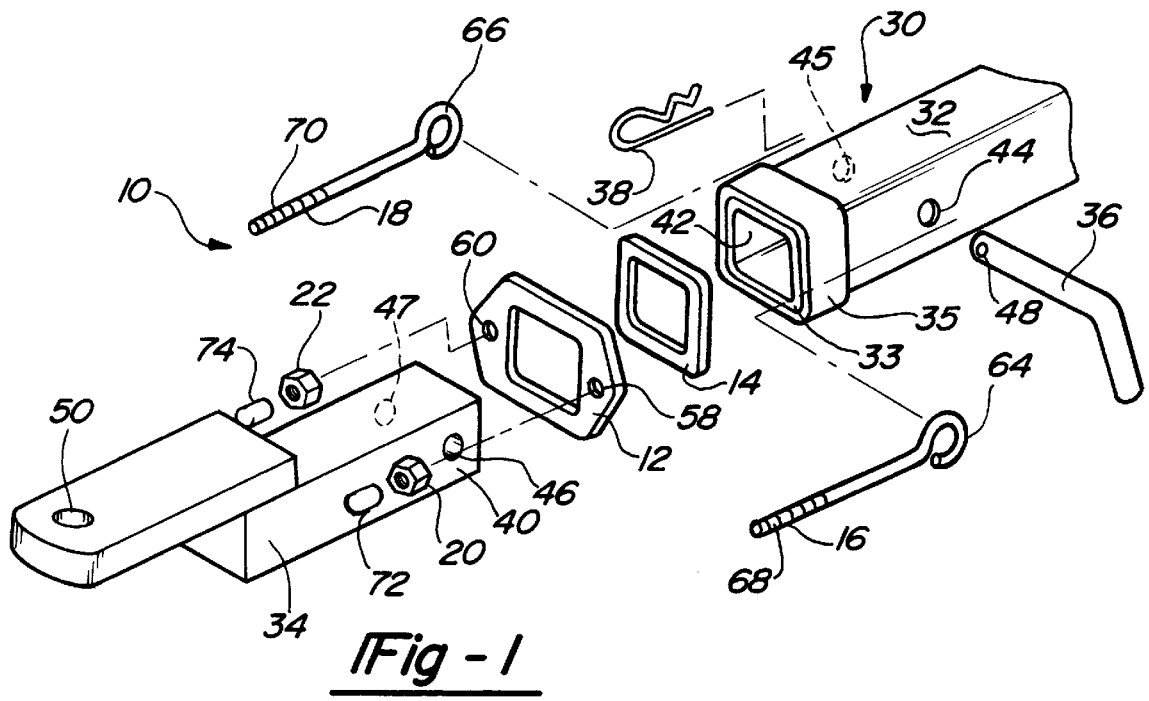
FIG. 1 is a partial exploded perspective of a hitch receiver and a ball mount to be inserted therein along with the anti-rattle device of the present invention.
Figure 2:
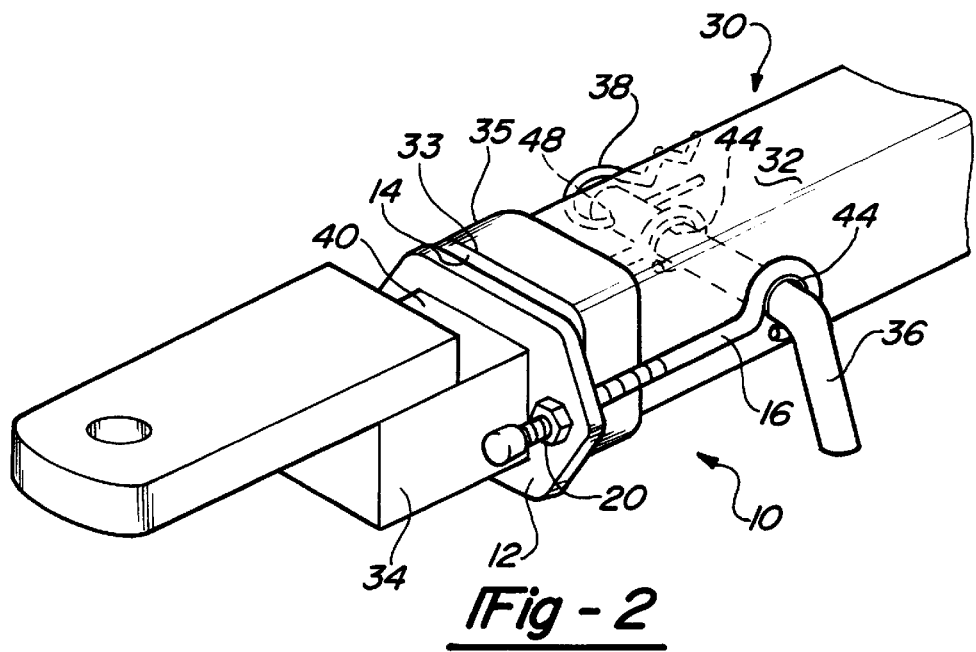
FIG. 2 is a partial perspective of the coupled hitch receiver and ball mount with the anti-rattle device of the present invention installed.
Figure 3:
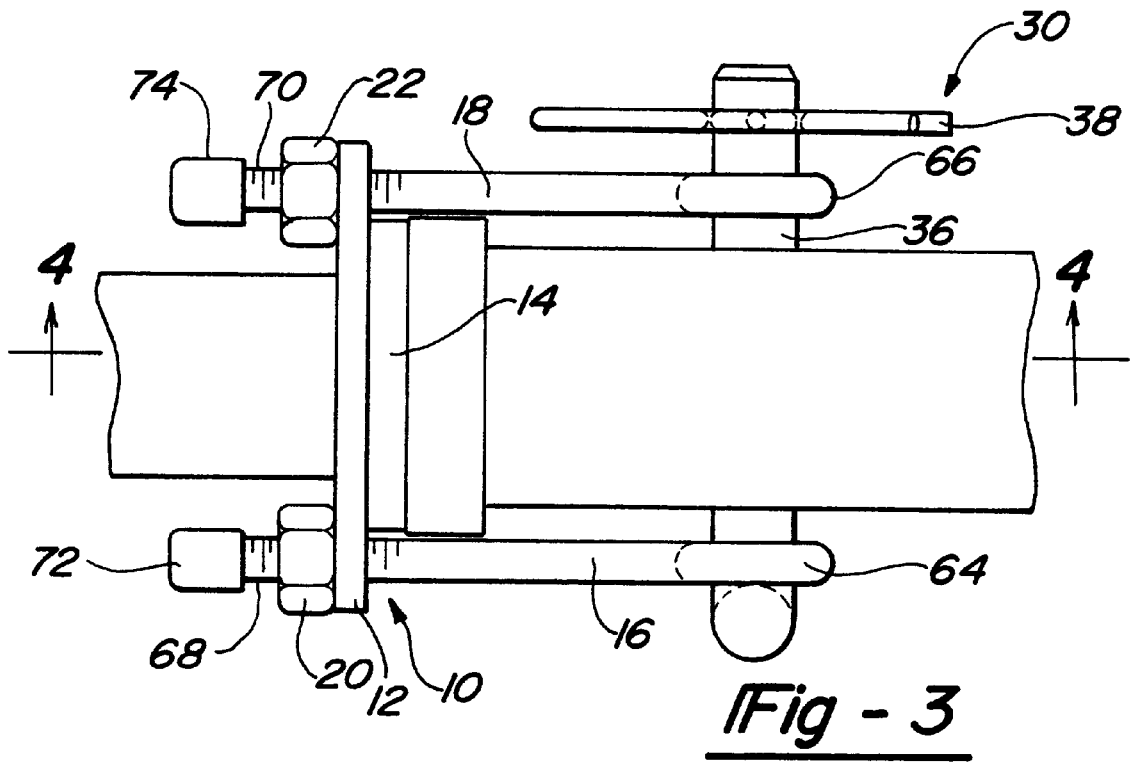
FIG. 3 is a partial top plan view of the assembled ball mount, receiver and anti-rattle device of the present invention.
Figure 4:
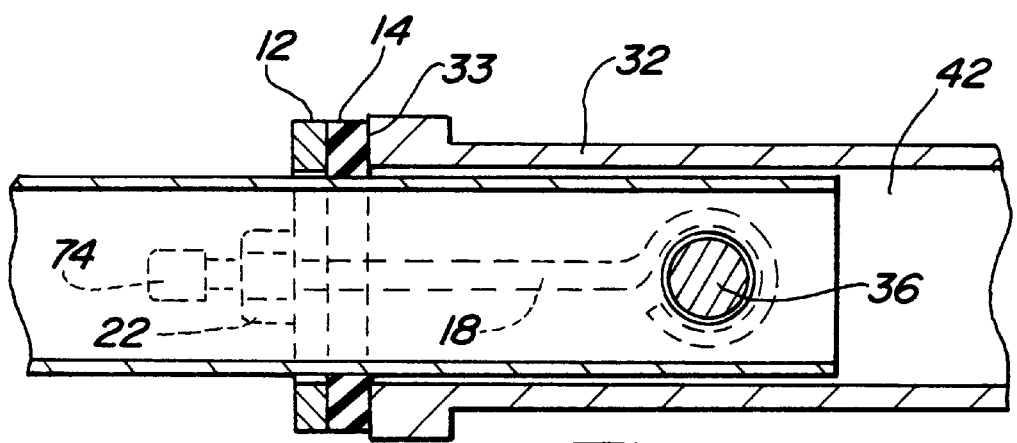
FIG. 4 is a cross-section along line 4—4 of FIG. 3.

Referring to FIGS. 1–6, the anti-rattle device 10 of the preferred embodiment of the present invention includes a plate member 12, an elastomeric member or isolator 14, eyebolts 16, 18 and corresponding nuts 20, 22. The device 10 is installed on a conventional receiver-type hitch generally referenced at 30 which includes a tubular hitch receiver 32, a ball mount 34 slidably insertable into the hitch receiver 32, a crosspin or locking pin 36, and a retaining clip 38. The mount 34 is provided with a shank 40 typically of square cross-sectional configuration and slidably insertable into the hollow interior 42 of receiver through open end 35. The hollow interior 42 is complementary in configuration to the shape of the exterior of shank 40 and sized to provide clearance about all sides of shank 40 to facilitate insertion into and withdrawal of the removable mount 34 into open end 35 with play necessarily created in lateral, vertical, fore, aft and rotational directions.

The crosspin 36 is inserted through holes 44, 45 provided on opposite sides of receiver 32 and corresponding aligned holes 46, 47 in the shank 40 of mount 34. The retaining clip 38 is inserted through hole 48 at one end of crosspin 36 to secure it in place. Apertures 44, 45 and 46, 47 are slightly larger in diameter than that of crosspin 36 to facilitate insertion and withdrawal of the crosspin 36 thereby necessarily creating clearance or play in the fore and aft directions.

Ball mount 34 includes an aperture 50 for attachment of a conventional trailer ball (not shown). While the preferred embodiment of the instant invention is described in reference to ball mount 34, it can be used without adaptation or modification in conjunction with any of a variety of mounts insertable and removable into and from a receiver 32, such as hitch mountable bicycle carriers, ski carriers, article carriers, workbenches and other devices mountable to a receiver 32 of a receiver-type trailer hitch.

Figure 5:
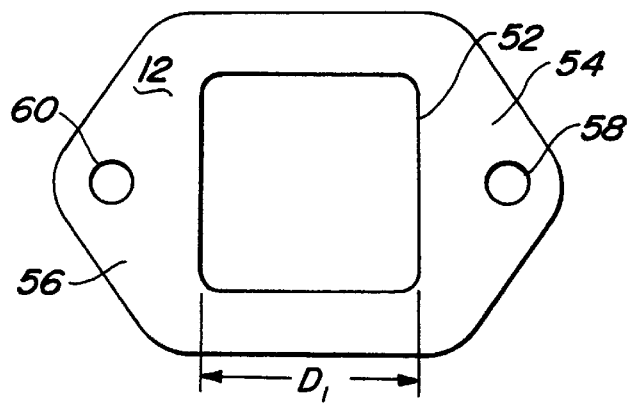
FIG. 5 is a front elevation of the plate of the anti-rattle device of the present invention.

Referring to FIGS. 1 and 5, the plate 12 is flat and provided with a substantially square opening 52 therethrough with a side dimension $D_1$ slightly larger than that of square shank 40 to permit slidable movement thereon. Plate 12 also is provided with a pair of opposed ear portions 54, 56 through which respective holes 58, 60 are provided. The plate member or flange 12 must have sufficient strength and rigidity to compress the elastomeric member 14 upon being drawn axially forward by an actuating means such as tension members or eyebolts 16, 18 upon tightening nuts 20, 22.

Figure 6:
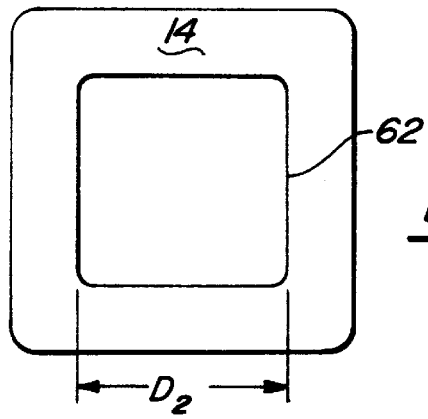
FIG. 6 is a front elevation of the isolator of the anti-rattle device of FIG. 1.

Referring to FIGS. 1 and 6, the elastomeric member 14 is formed from a material such as neoprene which in the preferred embodiment has an approximately 60 durometer. The elastomeric member 14 is provided with a substantially square opening 62 with a side dimension $D_2$ slightly less than that of shank 40 to provide an interference fit therewith. The elastomeric member 14 in the preferred embodiment is flat and substantially square in configuration. However, the elastomeric member 14 could be formed with any of a variety of cross sections, for example round provided that it is capable of displacing transversely so that it bulges into contact with both the outer walls of shank 40 and lip 33 of receiver tube 32 at open end 35 upon being axially compressed. The opening 62 may be of any configuration which generally corresponds to the cross-sectional shape of shank 32.

Eyebolts 16, 18 are conventional eyebolts with eyelets 64, 66, respectively, at one end of each and the other end having standard threaded portions 68, 70, respectively, to receive nuts 20, 24 to be threadably attached thereto. A hook or other anchoring means could be provided at the end of each of the bolts 16, 18 in place of eyelets 64, 66. Protective caps 72, 74 may be provided at the ends of the threaded portions 68, 70 protruding beyond the nuts 20, 22.

The eyelets 64, 66 are sized to allow the crosspin 36 to readily pass therethrough. The length of the eyebolts 16, 18 is sufficient to span from the crosspin 36 beyond the lip 33 of receiver 32 enough to allow for the thickness of elastomeric member 14, plate 12, nuts 22, 24, protective caps 72, 74 and permit adjustment of nuts 20, 22.

Figure 7:
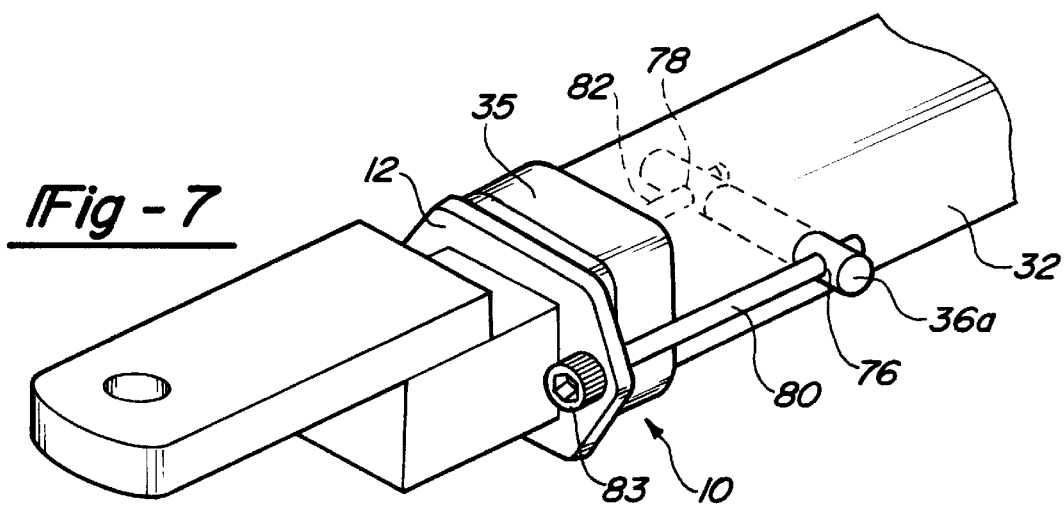
FIG. 7 is a partial perspective of an assembled ball mount and receiver with an alternate embodiment of the anti-rattle device of the present invention.

FIG. 7 illustrates an alternate embodiment of the anti-rattle device 10 wherein crosspin 36a is provided with spaced apart threaded openings 76, 78 to receive standard bolts such as hex head bolts 80, 82. The hex head 83 in each of bolts 80, 82 is adapted to receive an Alan wrench (not shown) to rotate the bolts 80, 82 and threadably adjust the tension between threaded cross pin 36a and the plate member 12.

In operation the plate member or flange 12 and elastomeric isolator 14 are positioned on the shank 40 of mount 34 prior to inserting mount 34 into the hollow interior 42 of the receiver 32. For convenience, the elastomeric member 14 in the preferred embodiment is sized and configured for an interference contact with shank 40 which enables the flange or plate member 12 and elastomeric isolator 14 to remain on and not inadvertently fall from the shank 40 when not in use. The mount 34 is then inserted into the receiver 32 so that opposed apertures 46, 47 of shank 40 are aligned with opposed apertures 44, 45 of hitch receiver 32. The end of cross pin 36 is inserted in succession through eyelet 64 of eyebolt 16, apertures 44, 46, 47 and 45, and finally through eyelet 66 of eyebolt 18. The retainer clip 38 is inserted through aperture 48 of the cross pin 36 thereby securing it in place. The plate member 12 is then drawn axially forward while the threaded ends 68, 70, respectively, of eyebolts 16, 18 are inserted through holes 58, 60 of plate member 12. The plate member 12 is of sufficient strength and rigidity to compress and deform the elastomeric member. Nuts 20, 22 are threaded onto the threaded portions 68, 70 of eyebolts 16, 18 and tightened thereon by a conventional tool such as a wrench (not shown). Protective caps 72, 74 are placed over the exposed ends of eyebolts 16, 18. The plate 12 is adjustably drawn toward lip 33 of the receiver 32 and compresses the elastomeric isolator 14 which is sandwiched between plate 12 and lip 33 upon tightening of nuts 20, 22. The tension resulting from tightening nuts 20, 22 onto eyebolts 16, 18 and against plate 12 causes the elastomeric member 14 to bulge and deform transversely, both inwardly and outwardly, thereby increasing the compression contact with the sides of shank 40 while also pulling the locking pin 36 axially in the aft direction and eliminating the clearance and any play or fore-aft movement between cross pin 36 and the apertures 44, 46 and 45, 47 through which it passes. The increased frictional engagement of the bulging elastomeric member 14 between the sides of shank 40 and lip 33 of receiver 32 dampens fore-aft movement and elastomerically limits movement of the shank 40 relative to the receiver 32 in all directions, thereby greatly reducing or eliminating undesired movement, noise, shock and vibration.

Anchoring the forward ends of the tension members 16, 18 to the cross pin 36 in the preferred embodiment ensures the use of the cross pin 36 as the primary means to secure the mount 34 in the receiver tube 32 and precludes the user from inadvertently mistaking the anti-rattle device as being the sole means of securing the shank 40 in the receiver tube 32.

The anti-rattle device 10 of the present invention is inexpensive to manufacture and is readily installed on conventional receiver hitches without the need for any modification whatsoever of conventional receivers or mounts.

It will be obvious to those skilled in the art that modifications can be made to the anti-rattle device of the present invention without departing from the spirit of the invention or the scope of the following claims.

I claim:

1. A receiver trailer hitch mechanism having an anti-rattle device mounted thereto, a receiver having an open end, and a mount slidably insertable into and removable from the open end of the receiver comprising:

a rigid member configured for movement along the mount;

a deformable elastomeric member disposed between said rigid member and said receiver;

tensioning means having anchoring means for anchoring the tensioning means to the receiver and means for urging said rigid member toward said receiver and deforming said elastomeric member into frictional engagement with said mount in proximity of said open end of said receiver and inhibiting movement of said mount within the receiver.

2. The receiver trailer hitch mechanism of claim 1 wherein said rigid member comprises a plate having a central aperture therethrough configured to correspond to the shape of said mount for slidable movement therealong.

3. The receiver trailer hitch mechanism of claim 1 wherein said deformable elastomeric member is provided with an aperture configured for interference fit onto said mount.

4. The receiver trailer hitch mechanism of claim 1 wherein said tensioning means includes a pair of bolts each provided with means for anchoring the bolts to the receiver.

5. The receiver trailer hitch mechanism of claim 4 wherein said bolts are each provided with a threaded portion spaced from said anchoring means and adjustment means threadably mounted on the threaded portions and engageable with the rigid member for adjusting the tension of the tensioning means.

6. The receiver trailer hitch mechanism of claim 5 wherein said plate is provided with ear portions on opposite sides of said central aperture and each of said ear portions having an aperture therethrough for receiving the threaded portion of a respective eyebolt.

7. A receiver trailer hitch mechanism having an anti-rattle device mounted thereto, a receiver having an open end, and a mount slidably insertable into and removable from the open end of the receiver and a securing member for securing the mount in the receiver comprising:

a rigid member configured for movement along the mount;

a deformable elastomeric member disposed between said rigid member and said receiver;

elongated tensioning means having anchoring means at one end thereof for anchoring the elongated tensioning means to the securing member and means at the other end of the elongated tensioning means for urging said rigid member toward said securing member and deforming said elastomeric member into frictional engagement with said mount in proximity to the open end of the receiver and inhibiting movement of said mount within the receiver.

8. The receiver trailer hitch mechanism of claim 7 wherein said rigid member comprises a plate having a central aperture therethrough configured to correspond to the shape of said mount for slidable movement therealong.

9. The receiver trailer hitch mechanism of claim 7 wherein said deformable elastomeric member is provided with an aperture configured for interference fit onto said mount.

10. The receiver trailer hitch mechanism of claim 7 wherein said elongated tensioning means includes a pair of eyebolts each provided with an eyelet for anchoring the eyebolts to the securing member.

11. The receiver trailer hitch mechanism of claim 10 wherein said eyebolts are each provided with a threaded portion spaced from said eyelet and adjustment means threadably mounted on the threaded portions and engageable with the rigid member for adjusting the tension of the tensioning means.

12. The receiver trailer hitch mechanism of claim 11 wherein said plate is provided with ear portions on opposite sides of said central aperture and each of said ear portions having an aperture therethrough for receiving the threaded portion of one of said eyebolts.

13. The receiver trailer hitch mechanism of claim 7 wherein said securing member comprises a cross pin having a pair of spaced apart threaded openings formed therein and said tensioning means comprises a pair of elongated members each having a head at one end for engagement against said rigid member and a threaded portion spaced from said head, one of said threaded portions each receivable in the spaced apart threaded openings in the cross pin.

14. A receiver trailer hitch mechanism having an anti-rattle device mounted thereto, a mount with an elongated substantially square cross section shank extending longitudinally therefrom, a receiver with a substantially square cross section hollow receiver tube with an end adapted to slidably receive said shank, a cross pin, aligned cross pin apertures provided in both said receiver tube and said shank for receiving said cross pin for removably securing said shank in said receiver tube, said receiver trailer hitch mechanism comprising:

a plate having a substantially square opening therethrough configured for sliding movement along said longitudinally extending shank;

a deformable elastomeric isolator having a substantially square opening therethrough configured for interference fit on said longitudinally extending shank, said isolator sandwiched between said plate and said end of the receiver tube;

a pair of elongated eyebolts, each having an eyelet at one end to receive said cross pin for anchoring said eyebolts to said cross pin on opposite sides of said receiver tube, said eyebolts each having a threaded portion at the other end, said plate having spaced apart eyebolt openings to receive said other end of said eyebolts;

a pair of nuts for threadable engagement with the threaded portions of said eyebolts for tensioning said plate with said cross pin and deforming said isolator into frictional engagement about the sides of said shank and end of said receiver tube for inhibiting undesirable movement between said shank and said receiver tube.

15. In a receiver trailer hitch mechanism having a receiver with an open end, a mount slidably insertable into and removable from the open end of the receiver, and an anti-rattle device mounted thereto, and a securing member spaced from the open end for securing the mount to the receiver, the improvement comprising:

a deformable elastomeric member disposed in proximity to the open end of the receiver and about the mount;

an elongated tension member having one end anchored to the securing member and distal ends operably connected to a flange for urging the flange toward the receiver and urged against the elastomeric member to compress and deform said elastomeric member into frictional engagement against said mount in proximity to the open end of the receiver.

16. A receiver trailer hitch mechanism as defined in claim 15 further comprising:

said securing member being a pin having distal ends extending laterally out of said receiver;

said elongated tension member having one end secured onto a distal end of said pin.

17. A receiver trailer hitch mechanism as defined in claim 16 further comprising:

said elongated tension member being a rigid fastener with one end mounted to a distal end of said pin;

said fastener having a threaded portion and a fastener engaging said threaded portion for urging said flange against said deformable elastomeric member.

18. A receiver trailer hitch mechanism as defined in claim 16 further comprising said elongated tension member having a looped end looped onto a distal end of said pin.

* * * * *